(12) United States Patent
Kim et al.

(10) Patent No.: US 12,375,341 B2
(45) Date of Patent: Jul. 29, 2025

(54) DETECTION OF FAILURES IN VIRTUALIZED RADIO ACCESS NETWORKS

(71) Applicant: MICROSOFT TECHNOLOGY LICENSING, LLC, Redmond, WA (US)

(72) Inventors: Daehyeok Kim, Redmond, WA (US); Anuj Kalia, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 579 days.

(21) Appl. No.: 17/827,684

(22) Filed: May 28, 2022

(65) Prior Publication Data

US 2023/0388178 A1 Nov. 30, 2023

(51) Int. Cl.
*H04L 41/0668* (2022.01)
*H04L 41/40* (2022.01)

(52) U.S. Cl.
CPC .......... *H04L 41/0668* (2013.01); *H04L 41/40* (2022.05)

(58) Field of Classification Search
CPC .......................... H04L 41/0668; H04L 41/40
See application file for complete search history.

(56) References Cited

U.S. PATENT DOCUMENTS

| | | | |
|---|---|---|---|
| 11,204,109 B2 * | 12/2021 | Vaccaro | H02G 3/32 |
| 11,304,109 B1 | 4/2022 | Potharaju et al. | |
| 2015/0124626 A1 * | 5/2015 | Sul | H04L 47/825 370/241.1 |
| 2017/0163342 A1 * | 6/2017 | Testa | H04Q 11/0003 |
| 2018/0077006 A1 * | 3/2018 | Cui | H04L 41/40 |
| 2019/0053183 A1 | 2/2019 | Park et al. | |
| 2020/0100130 A1 * | 3/2020 | Bahnasy | H04W 92/12 |
| 2021/0127452 A1 * | 4/2021 | Uchida | H04W 88/027 |
| 2022/0078631 A1 * | 3/2022 | Salahuddeen | H04L 45/16 |

FOREIGN PATENT DOCUMENTS

KR 20190026239 A 3/2019

OTHER PUBLICATIONS

F. Civerchia, K. Kondepu, J. C. Borromeo, N. Sambo, P. Castoldi and L. Valcarenghi, "A Fast and Low Capacity Virtual RAN Recovery based on PDCP Split and Optical Fronthaul Traffic Filtering," 2020 IEEE 3rd 5G World Forum (5GWF), Bangalore, India, 2020, pp. 430-435, doi: 10.1109/5GWF49715.2020.9221182. (Year: 2020).*

Paola, et al., "H2020 5G—Transformer Project: Final design and implementation report on the MTP (report)", Retrieved from: https://web.archive.org/web/20200905115507/http://5g-transformer.eu/wp-content/uploads/2019/05/D2.3_Final_design_and_implementation_report_on_the_MTP_report.pdf, May 1, 2019, 110 Pages.

"International Search Report and Written Opinion Issued in PCT Application No. PCT/US2023/018241", Mailed Date: Jul. 5, 2023, 14 Pages.

* cited by examiner

*Primary Examiner* — Joseph A Bednash
(74) *Attorney, Agent, or Firm* — Han Gim; Newport IP, LLC

(57) ABSTRACT

Data traffic is communicated between a radio unit (RU) of a cellular network and a virtualized radio access network (vRAN) instance of a vRAN. In response to determining that the vRAN instance has failed to communicate a downlink fronthaul packet to the RU within a threshold timeout interval, a failure notification is sent to a PHY layer failure response function. The failure to communicate the downlink fronthaul packet to the RU within the threshold timeout interval is indicative of a failure of the vRAN instance.

20 Claims, 6 Drawing Sheets

DETECTION OF FAILURES IN VIRTUALIZED RADIO ACCESS NETWORKS

BACKGROUND

A growing number of 5G deployments are implemented using virtualized radio access networks (vRANs), where traditional specialized hardware for radio access network (RAN) processing are replaced with software-based functionality running on commodity servers. Efficient handling of PHY layer failure is critical for vRANs as such failures can directly impact the quality of service for millions of user devices. However, implementation of such mechanisms for vRAN software stacks is challenging because of strict real-time latency requirements as well as software complexity of the vRAN PHY layer.

It is with respect to these considerations and others that the disclosure made herein is presented.

SUMMARY

In a vRAN, a healthy PHY process sends a downlink fronthaul packet for every Transmission Time Interval (TTI), which may be used as an indicator of the liveness of the PHY process. The present disclosure provides a mechanism for detection and failover for vRAN PHY failures that meets performance requirements of the PHY layer in vRANs that are a part of a cellular network infrastructure (e.g., LTE and 5G). In an embodiment, techniques are described for detecting a failure within a TTI of 500 microseconds and rerouting fronthaul traffic to a backup server. The failure detection may operate entirely in the data plane.

In one embodiment, a programmable switch that routes the fronthaul traffic may be configured to monitor the frequency of the downlink fronthaul packet to detect failures. For fast failover, routing tables may be updated in the data plane of the programmable switch so that fronthaul traffic can be seamlessly routed to a backup PHY process and server upon detection of the failure.

The techniques disclosed herein can enable resiliency to PHY failures in a vRAN, thus improving the reliability of services provided by various types of mobile networks. Other technical effects other than those mentioned herein can also be realized from implementations of the technologies disclosed herein.

This Summary is provided to introduce a selection of concepts in a simplified form that are further described below in the Detailed Description. This Summary is not intended to identify all of the key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGURES. In the description detailed herein, references are made to the accompanying drawings that form a part hereof, and that show, by way of illustration, specific embodiments or examples. The drawings herein are not drawn to scale. Like numerals represent like elements throughout the several FIGURES.

DETAILED DESCRIPTION OF ILLUSTRATIVE EMBODIMENTS

Radio access networks (RANs) are a part of a cellular network infrastructure (e.g., LTE and 5G) that converts wireless signals communicated from user devices (which may also be referred to as User Equipment (UE)) to radio cell towers into data packets and vice versa. In many of today's systems, specialized RAN hardware is being replaced with software systems running on commodity servers deployed in edge datacenters, which are located in closer geographic proximity to the radio cell towers. This approach, which may be referred to as a virtualized RAN (vRAN), can provide benefits such as reducing vendor lock-in, rapid feature development and upgrades, easier maintenance, and lower costs.

Figure 1A:
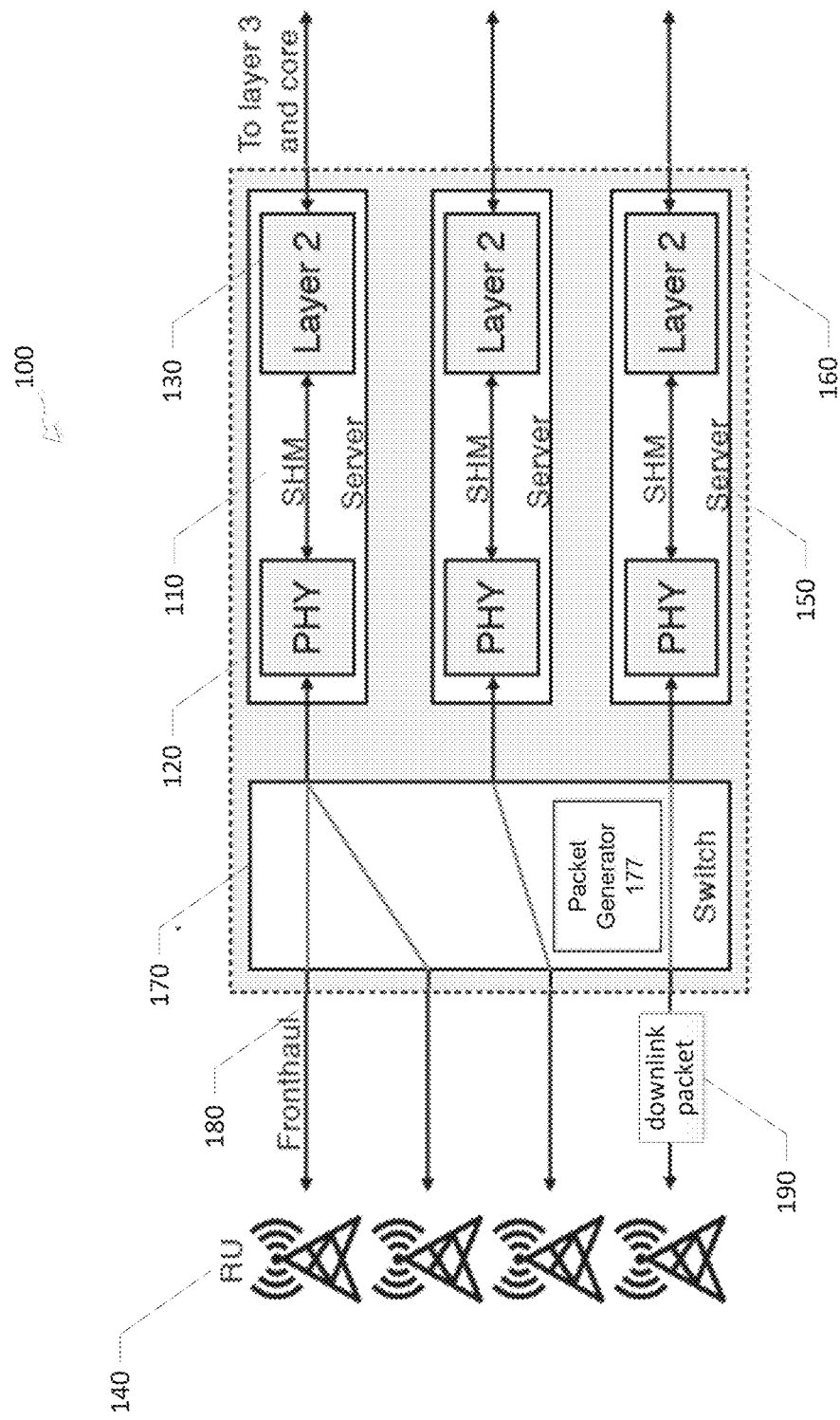
FIG. 1A depicts an example vRAN illustrating an embodiment of the disclosure.

Typical vRAN deployment models present some challenges for providing high availability. FIG. 1A illustrates an example of hardware and software components of a typical vRAN deployment 100 in accordance with the present disclosure. In an embodiment, shared memory (SHM) 110 may be a shared memory channel between the physical (PHY) layer 120 and layer 2 (L2) 130. The vRAN deployment 100 may include one or more radio units (RUs) 140 connected to servers 150 in an edge datacenter 160. The RUs 140 may be connected to servers 150 via fiber-optic fronthaul links. A switch 170 in the edge datacenter 160 connects an RU 140 to a vRAN server 150. The RU to server mapping is rarely changed, typically when new RUs or servers are added.

In an embodiment, the switch 170 may be a programmable network device. While the switch 170 may be implemented as a software switch, such an implementation would require server capacity or an additional server and may not meet timing requirements due to additional latencies. As switch 170 is located in the path of RAN data traffic 180, the switch 170 can be leveraged for detecting that downlink fronthaul packets 190 are sent for every TTI. Additionally, by leveraging the programmability of switch 170, the logic for monitoring the downlink packets 190, detecting failures, and updating routing tables can be implemented in the switch 170 without incurring the performance overhead of server-implemented software-based mechanisms.

For example, one or more programs encoding a failure detection and failover mechanism can be implemented to enable switch 170 to detect that each of the servers 150 sends a downlink packet at each TTL. In an embodiment, the TTL can be 500 microseconds.

At least some of the servers 150 in the edge datacenter 100 may run layers of the cellular stack that have strict real-time requirements for PHY 120 and L2 130 layers. Higher layers of the vRAN stack (i.e., L3 and above), as well as the core network, may have less stringent latency requirements and can run in a datacenter situated farther from the RUs 140. The PHY layer 120 may include complex software applications that perform computationally intensive signal processing tasks, such as channel estimation, modulation/demodulation, and forward error correction. The L2 layer 130 may be primarily responsible for scheduling the frequency and time resources among UEs. The L2 layer 130 may also connect to higher vRAN layers, which in turn may connect to the cellular core network.

Servers 150, which run the PHY 120 and L2 130 layers of the vRAN stack, is typically configured to serve a fixed set of the RUs 140. The L2 layer 130 may include the Medium Access Control (MAC) and Radio Link Control (RLC). Two aspects of the lower RAN layers can make PHY failure detection and failover challenging: real-time latency requirements, and high software complexity. In particular, PHY processing imposes stringent tail latency requirements, requiring baseband processing tasks to be completed within strict transmission time intervals (TTIs), measuring as low as 500 μs in common 5G deployment configurations. Existing approaches that may be implemented in servers may not support such requirements, since they can require tens of milliseconds to seconds to complete migration in response to a failure. Such downtime in PHY processing can cause severe service disruptions. A PHY process can crash due to a number of reasons, including hardware failures, as well as crashes of the PHY or platform software (e.g., the container orchestration system, device drivers, etc.).

In an embodiment of the present disclosure, a PHY failure detection and failover mechanism may fulfill the objective that fronthaul-related changes must take effect at the same slot number that is chosen for migration for correctness. That is, a new routing rule must take effect in sync with the failure detection and failover mechanism, and within the slot duration (e.g., 500 μs).

One approach is to re-route fronthaul packets to a server running a software function. However, this approach requires dedicating overhead servers or CPU cores for processing the high bandwidth fronthaul traffic, which is inefficient and undesirable in a small edge datacenter that has only a few servers. Instead of relying on a server-based approach, the present disclosure implements a programmable switch-based fronthaul middlebox such as switch 170.

When a PHY process fails, the switch 170 may migrate PHY processing to the hot inactive PHY context on a different server. This can prevent disruption to users while the operator can service the failed PHY process.

In various embodiments, the disclosed techniques provide a PHY failure detection mechanism that (1) works transparently without modifications to the PHY, (2) detects PHY failures rapidly to minimize the number of dropped slots, and (3) has low CPU overhead. Alternative approaches that detect service failures with sub-millisecond latencies fail to meet these requirements. Such alternative approaches may employ, for example, leases based on periodic messages between a failure detector and the target service. Using such approaches typically requires modifying the PHY software to add lease message handling logic, as well as dedicating overhead CPU cores for low-latency lease message processing.

Figure 1B:
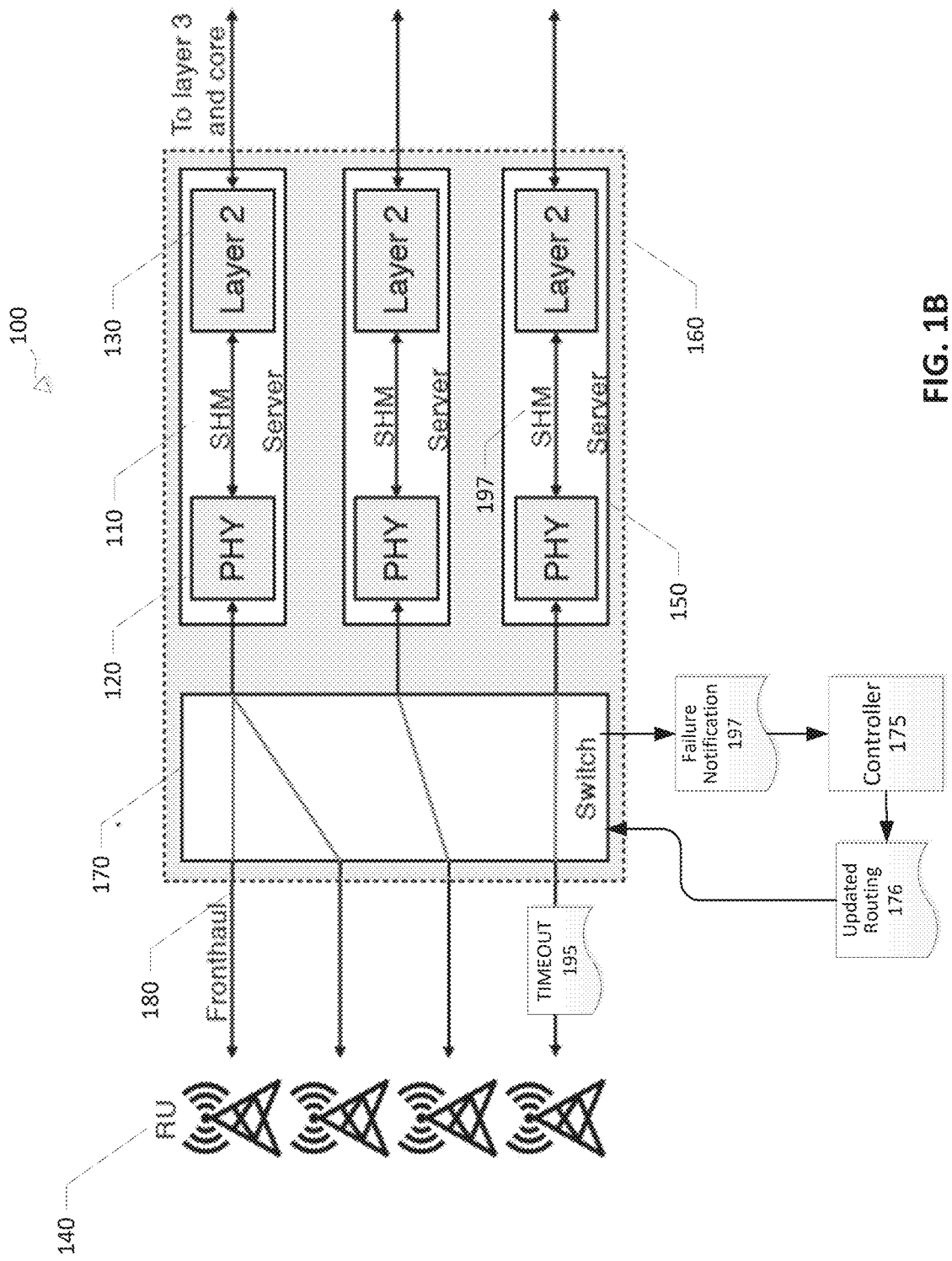
FIG. 1B depicts an example vRAN illustrating an embodiment of the disclosure.

A healthy PHY is a strict real-time application that sends downlink fronthaul packets to the RU in every slot duration. This characteristic can be leveraged as a natural source of liveness pings to enable a transparent and fast in-network failure detector for the PHY that has no CPU overhead. In an embodiment, a PHY failure may be detected by monitoring the inter-packet gap between the PHY's downlink packets. With references to FIG. 1B, a timeout 195 can be detected when the inter-packet gap exceeds a timeout interval (T). In response to detecting the timeout 195, a failure notification 197 can be sent to a PHY layer failure response function when the inter-packet gap exceeds the timeout interval (T) for the failed PHY 120. In an embodiment, the PHY layer failure response function may be a controller 175. The controller 175 may be configured to update the RU-to-PHY mapping and send the updated mapping 176 to the switch 170. In one embodiment, the timeout interval may be set to 450 μs. This value may be selected based on measurements of maximum inter-packet gap downlink packets which can be 393 μs in some implementations.

In an embodiment, a PHY failure detection engine (not shown) may be implemented as part of the data plane of the programmable switch 170. In order to account for programmable switches that lack timers, timer ticks can be emulated by using the programmable switch's packet generator 177 to generate a packet once every T/n microseconds. The parameter n may govern how precisely the switch matches the timeout value T. In one example, n may be set to 50, which results in a 9 μs precision when the TTL is 450 μs and with negligible switch overhead (50k packets per second).

In one embodiment, an in-switch timeout register may be used with per-PHY entries. Each downlink packet from a PHY may set its timeout entry to 0, and each timer packet may read and increment this entry by 1. When a PHY fails, its timeout register entry reaches n after n timer ticks. The next timer packet detects this PHY's failure by observation of the saturated register entry.

In an embodiment, the programmable switch 170 may then re-format the timer packet into failure notification packet 197 and forward the notification packet 197 to the L2 layer 130 for the failed PHY 120. In response to receiving the failure notification packet 197, the L2 layer 130 may trigger a migration process. In one embodiment, the migration process may be triggered by sending a command to the programmable switch 170 to trigger a fronthaul migration. In an embodiment, the command may be sent via a functional application platform interface (FAPI).

Figure 2:
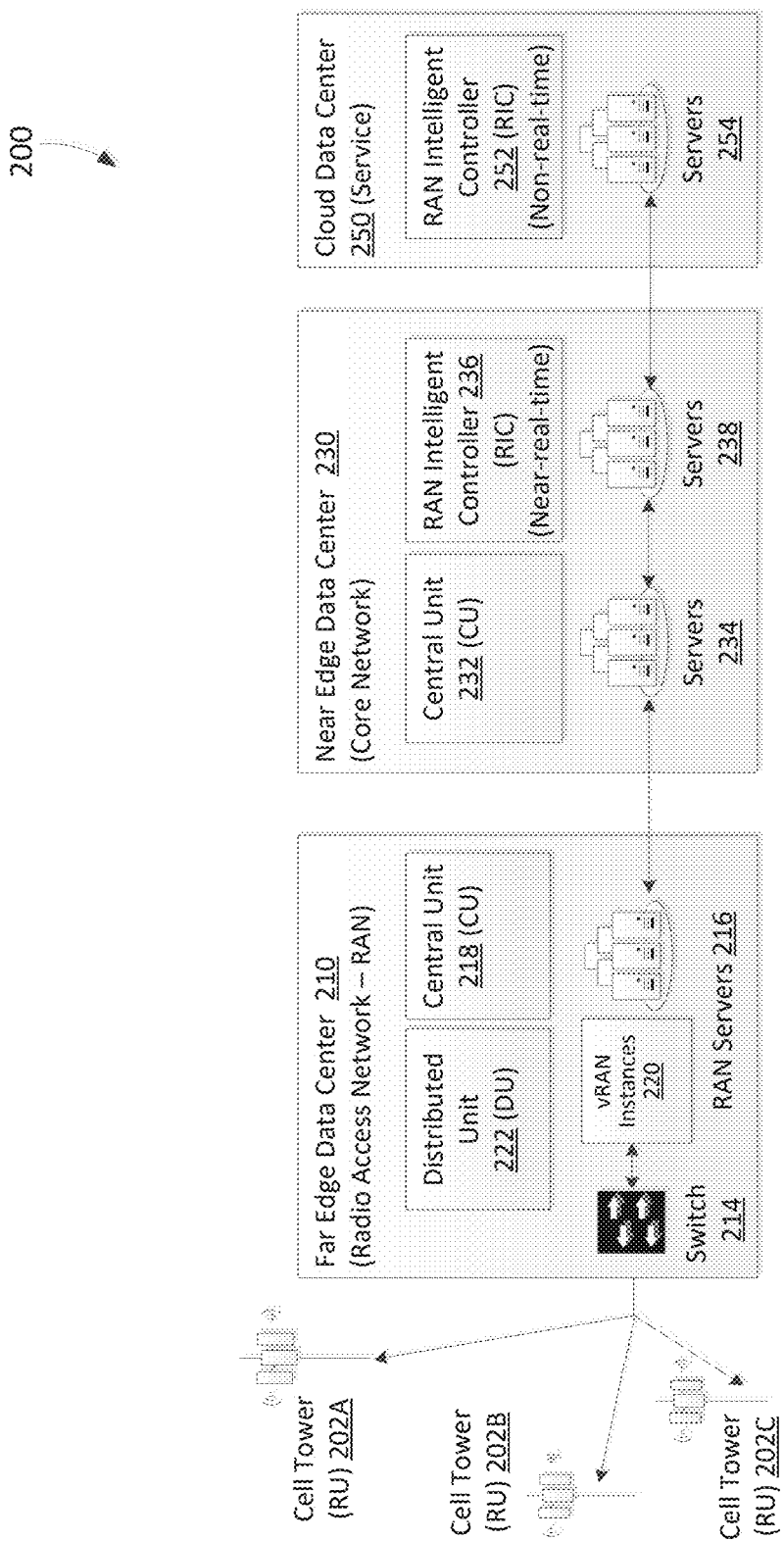
FIG. 2 depicts an example of a networked environment where aspects of the disclosure may be implemented.

FIG. 2 illustrates an overview of an example system 200 in which the disclosed embodiments may be implemented. Cell towers 202A-C may transmit and receive wireless communications with mobile computing devices (e.g., smartphones) over a radio access network (RAN). The example system 200 may further include far-edge datacenter 210 (switches, RAN servers), near-edge datacenter 230 (core network servers), and cloud datacenter 250 (cloud services). In aspects, the example system 200 may correspond to a cloud RAN infrastructure for a mobile wireless telecommunication network.

The far-edge datacenter 210 may be a datacenter that is part of the cloud RAN, which includes distributed unit 222 (DU) and central unit 218 (CU). In an embodiment, the far-edge datacenter 210 may enable cloud integration with a radio access network (RAN). The far-edge datacenter 210 may include a switch 214 and RAN servers 216 configured to host vRAN instances 220 for processing RAN data. A vRAN may be a type of RAN in which networking functions (including the control and data planes) are separated from the hardware that hosts the vRAN (e.g., RAN server(s) 216). In general, network function virtualization (NFV) involves enabling software to perform hardware-based functions, which enables increased responsiveness to network fluctuations and increased flexibility for enhancement since software can be upgraded or repaired more easily than hardware. In an embodiment, a vRAN instance 220 may be referred to as a worker for processing workflows.

The switch 214 and the RAN servers 216 may process incoming data traffic and outgoing data traffic associated with layer one (the physical layer or PHY) 120 and at least a part of layer two L2 (MAC) 130. In an embodiment, the far-edge datacenter 210 may be generally geographically remote from the cloud datacenters associated with the core network and cloud services. The remote site may be in proximity to the cell towers 202A-C. For example, the proximity in the present disclosure may be within a few kilometers or more. In aspects, the upstream data traffic may correspond to data flowing from the cell towers 202A-C to servers 254 in the cloud datacenter 250 (service). Similarly, the downstream data traffic may correspond to data flowing from the cloud datacenter 250 (service) to the cell towers.

The near-edge datacenter 230 (e.g., hosting the core network) may include a central unit 232 (CU) and RAN intelligent controller 236 (RIC) (near real-time processing, which may be less strictly time-sensitive than real-time processing). As illustrated, CU 232 may be associated with servers 234 and RIC 236 may be associated with servers 238. In some embodiments, the near-edge datacenter 230 may be at a regional site of a private cloud service. For example, the regional site may be about tens of kilometers from the cell towers.

The cloud datacenter 250 (service) may include RIC 252 (non-real-time processing) associated with servers 254. For example, RIC 252 may process non-real-time service operations. In some embodiments, the cloud datacenter 250 may be at a central location in a cloud RAN infrastructure. For example, the central locations may be hundreds of kilometers from the cell towers.

In an embodiment, the far-edge datacenter 210, which may by closer to the cell towers 202A-C than the cloud datacenter 250, may provide real-time processing. In contrast, the cloud datacenter 250, which may be the furthest from the cell towers 202A-C in the cloud RAN infrastructure, may provide processing in a non-real-time manner.

Figure 3:
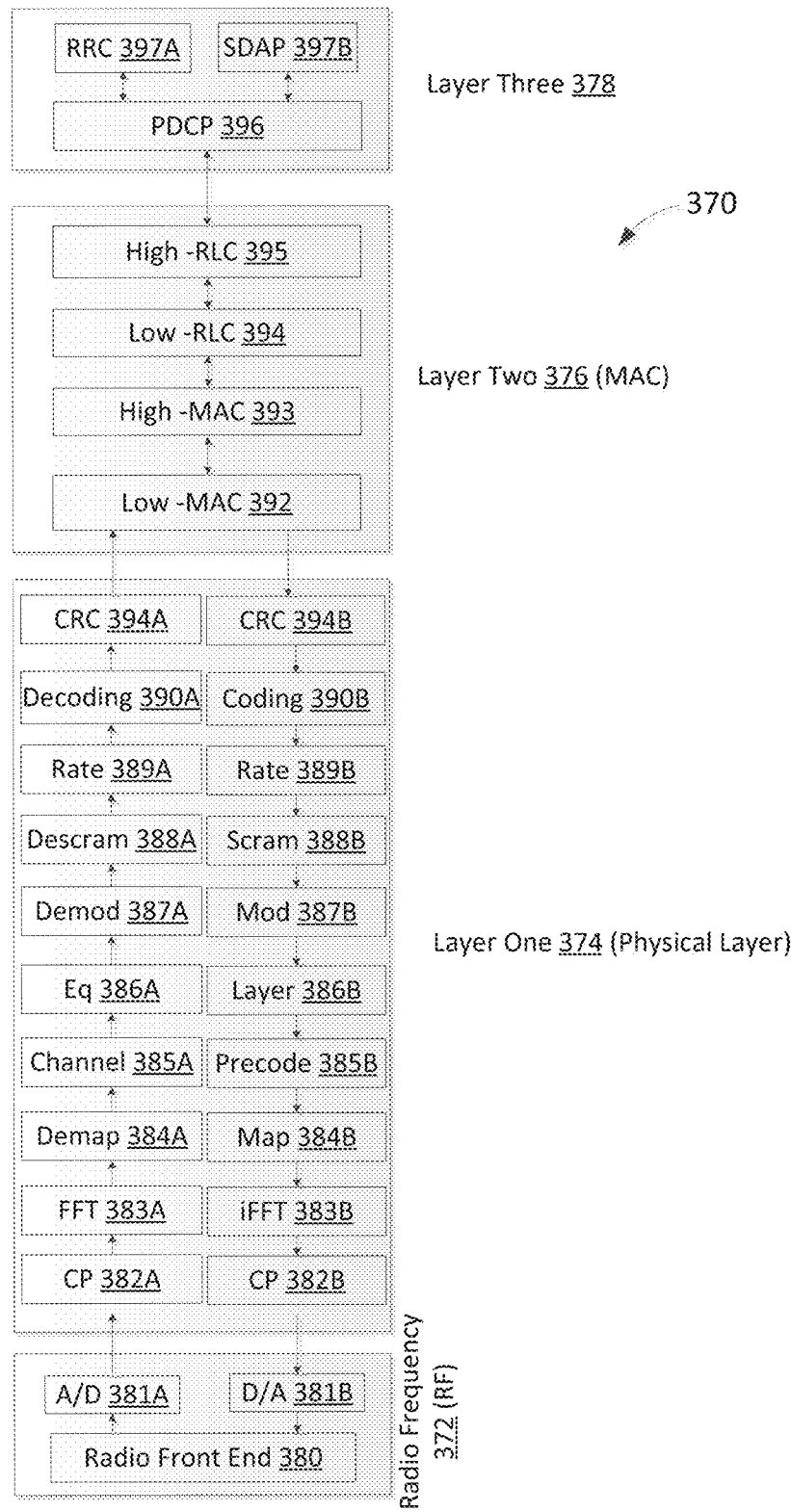
FIG. 3 depicts an example of a networked environment where aspects of the disclosure may be implemented.

Referring to FIG. 3, operational partitions 370 illustrate various operational segments for processing data traffic in the RAN. For example, the operational partitions 382-391 may correspond to layer one (PHY) 374 processing and operational partitions 392-395 may correspond to layer two (L2) 376 processing of the Open Systems Interconnection (OSI) seven-layer model.

In an embodiment, conversion of data associated with a radio frequency 372 (RF) may occur prior to processing data at layer one 374. For radio frequency 372 (RF) data processing, the radio front-end partition may receive and send data through the cell towers 102A-C to mobile computing devices over wireless communications. The A/D 381A may convert analog data from the radio front-end to digital data for the upstream data traffic. The D/A 381B may convert digital data into analog data for the downstream data traffic. In some embodiments, the interface between DU and RU in a cloud RAN may be referred to as fronthaul. The fronthaul may define a number of planes of operations, including the c-plane (control plane), the u-plane (user plane), the s-plane (synchronization plane), and the m-plane (management plane). In general, c-plane data may be directed to scheduling and coordination of data transmission, u-plane data may be directed to efficient data transfer (e.g., defined by 5G specifications), s-plane data may be directed to timing and synchronization of data transmission between RU and DU, and m-plane data may relate to managing the RU. Packets having data payloads related to the different planes of operation may comprise corresponding header information, e.g., a c-plane header, u-plane header, etc.

Partitions in layer one 374 (physical layer) may be associated with operations for converting coded symbols associated with a bit stream into a physical signal for transmission using communication media (e.g., a physical wire or radio). In an embodiment, the operational partitions for processing upstream data traffic of the physical layer may include, CP 382A, FFT 383A, Demap 384A, Channel 385A, Eq 386A, Demod 387A, Descram 388A, Rate 389A, Decoding 390A, and CRC 391A. The operational partitions for processing downstream data traffic in the physical layer may include, CRC 391B, Coding 390A, Rate 389B, Scram 388B, Mod 387B, Layer 386B, Precode 385B, Map 384B, iFFT 383B, and CP 382B.

Partitions in layer two L2 376 (media access control—MAC) may be associated with operations for transferring data frames between network hosts over a physical link. In an embodiment, partitions in layer two L2 may correspond to the data link layer in the OSI seven-layer model. Low-MAC 392 may be the lowest partition in the layer two L2 376. Other partitions above the Low-MAC 392 may include, an ascending sequence of layers, High-MAC 393, Low-Radio Link Control (RLC) 394, and High-RLC 395.

Partitions in the layer three 378 may be associated with operations for forwarding data packets through routers. In an embodiment, layer three 378 may correspond to the network layer in the OSI seven-layer model. The partitions in layer three 378 may be associated with protocol-governed operations such as Packet Data Convergence Protocol 396 (PDCP), Radio Resource Control 397A (RRC) and Service Data Adaptation Protocol 397B (SDAP).

In some embodiments, a combination of DU 222 and CU 218 in the far-edge datacenter 210 may process partitions associated with layer one 374, layer two 376, and at least a part of layer three 378. In particular, respective servers of RAN servers 216 may include central processors (CPUs) and a variety of accelerators for processing data associated with one or more partitions of the operational partitions 370.

As previously noted, to meet 5G requirements, layers one and two may need to be processed in essentially real time. In particular, detection of PHY failures and effecting a failover mechanism in a correct and timely manner is critical in the RAN in various scenarios. For example, RAN workloads may include processing IQ samples from cell towers. Quadrature signals, also called IQ signals, IQ data or IQ samples, are often used in radio frequency (RF) applications, such as a RAN. IQ samples form the basis of complex RF signal modulation and demodulation, both in hardware and in software, as well as in complex signal analysis. To facilitate transmission of this type of data, IQ samples are often compressed and are transmitted via u-plane data packets with corresponding u-plane headers. This type of RAN data requires real-time processing to meet latency and other performance metrics of 5G.

Traditionally, detection of PHY failures is handled by servers running failure detection software. However, rerouting RAN traffic to such servers increases both energy and capital costs, degrades the end-to-end performance, and requires additional physical space, all of which are undesirable or even infeasible for a RAN far-edge datacenter. The present disclosure addresses this issue by the detection of PHY failures and effecting a failover mechanism via programmable switches 170 (FIG. 1A, 1B) at the far-edge datacenter 110, 210. As illustrated by FIG. 2, switch 214, which may correspond to programmable switch 170, may be located in the path of data traffic at the interface between the RU and DU cloud infrastructure components.

In an embodiment, since switch 114, 170 is in the path of the data traffic, switch 114, 170 is able to access real-time packet, network, and resource information. By leveraging programmability of switch 114, 170, detection of PHY failures and effecting a failover mechanism can be applied without incurring the performance, energy, and capital cost overheads of traditional server-based systems. The detection of PHY failures and failover mechanism may be customized for the RAN infrastructure. For instance, the switch 114, 170 may be programmatically enabled to detect the absence of downlink fronthaul packets for every TTI, which may be used as an indicator of the liveness of a PHY process. For example, switch 114, 170 may be programmed to identify packets in the u-plane from packets in the c-plane by inspecting a plane field in the packet header. Furthermore, switch 114, 170 may be programmed to monitor the inter-packet gap between the PHY's downlink packets. A failure notification can be sent to the L2 layer when the inter-packet gap exceeds the timeout interval (T).

Switch 114, 170 may also be programmed to re-format the timer packet into a failure notification packet and forward the notification packet to the L2-side. As a result, RAN processing efficiency and fault tolerance may be improved.

As will be appreciated, the various methods, devices, applications, features, etc., described with respect to FIGS. 1A, 1B, 2, and 3 are not intended to limit the system 100 to being performed by the particular applications and features described. Accordingly, additional controller configurations may be used to practice the methods and systems herein and/or features and applications described may be excluded without departing from the methods and systems disclosed herein.

Figure 4:
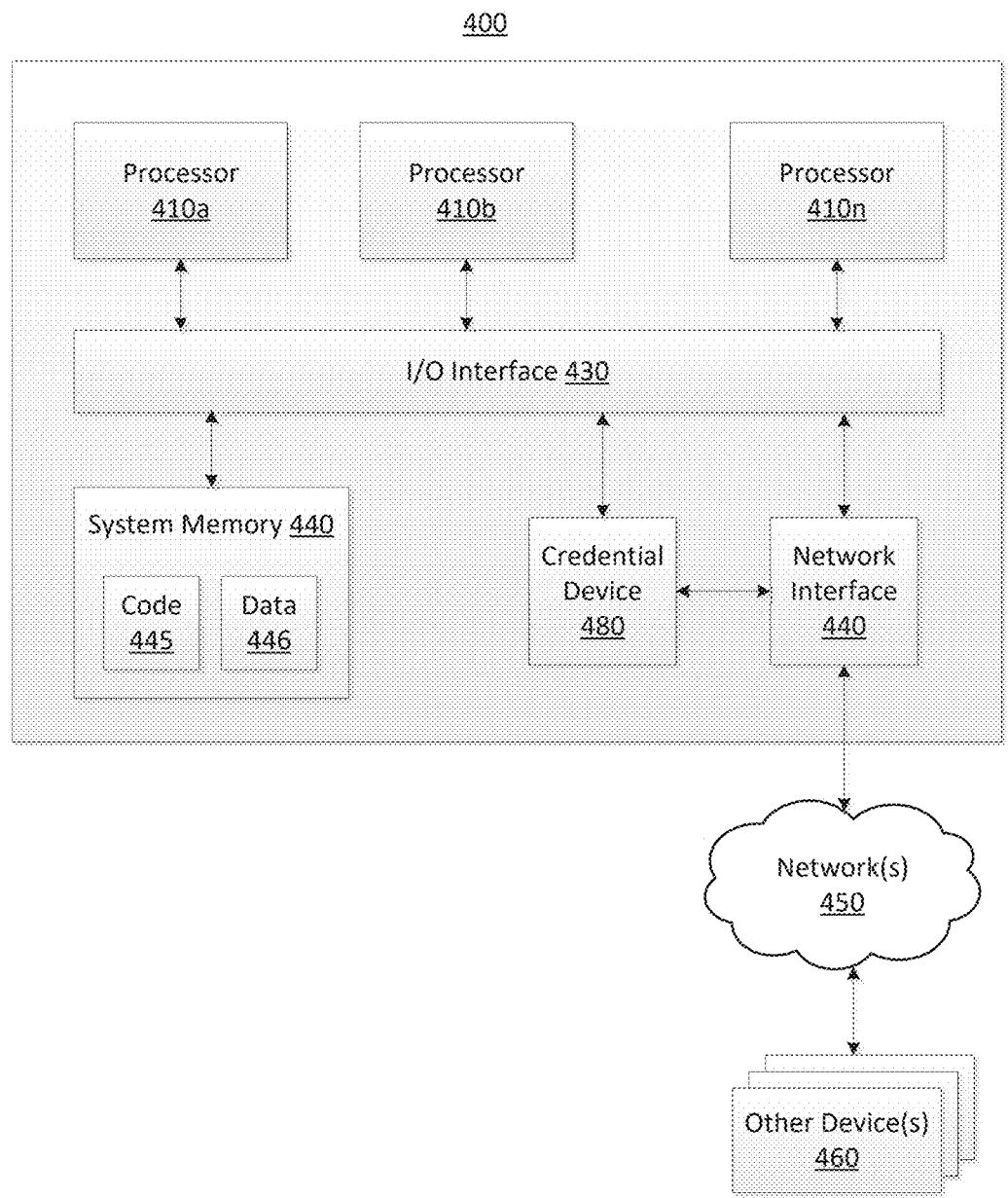
FIG. 4 depicts an example of a computing device where aspects of the disclosure may be implemented.

In at least some embodiments, a computing device that implements a portion or all of one or more of the technologies described herein may include a general-purpose computer system that includes or is configured to access one or more computer-accessible media. FIG. 4 illustrates such a general-purpose computing device 400. In the illustrated embodiment, computing device 400 includes one or more processors 410a, 410b, and/or 410n (which may be referred herein singularly as "a processor 410" or in the plural as "the processors 410") coupled to a system memory 440 via an input/output (I/O) interface 440. Computing device 400 further includes a network interface 440 coupled to I/O interface 430.

In various embodiments, computing device 400 may be a uniprocessor system including one processor 410 or a multiprocessor system including several processors 410 (e.g., two, four, eight, or another suitable number). Processors 410 may be any suitable processors capable of executing instructions. For example, in various embodiments, processors 410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 410 may commonly, but not necessarily, implement the same ISA.

System memory 440 may be configured to store instructions and data accessible by processor(s) 410. In various embodiments, system memory 440 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 440 as code 445 and data 446.

In one embodiment, I/O interface 430 may be configured to coordinate I/O traffic between processor 410, system memory 440, and any peripheral devices in the device, including network interface 440 or other peripheral interfaces. In some embodiments, I/O interface 430 may perform any necessary protocol, timing, or other data transformations to convert data signals from one component (e.g., system memory 440) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 440, may be incorporated directly into processor 410.

Network interface 440 may be configured to allow data to be exchanged between computing device 400 and other device or devices 460 attached to a network or network(s) 450, such as other computer systems or devices as illustrated herein, for example. In various embodiments, network interface 440 may support communication via any suitable wired or wireless general data networks, such as types of Ethernet networks, for example. Additionally, network interface 440 may support communication via telecommunications/telephony networks such as analog voice networks or digital fiber communications networks, via storage area networks such as Fibre Channel SANs, cellular voice and/or data networks, or via any other suitable type of network and/or protocol. When a network interface 440 provides cellular communication, its operation may be supported by a credential device 480 that may provide authentication, authorization, and other related information and services.

In some embodiments, system memory 440 may be one embodiment of a computer-accessible medium configured to store program instructions and data as described herein for FIGS. 1-3 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 400 via I/O interface 430. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 400 as system memory 440 or another type of memory. Portions or all of multiple computing devices, such as those illustrated in FIG. 4, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

The communications devices as used herein may refer to devices including, but not limited to, smartphones, cellular-enabled tablets and laptops, companion devices (e.g., smart watches), and non-consumer devices (telematics device in an automobile, cellular-connected utility meters), and the like.

Figure 5:
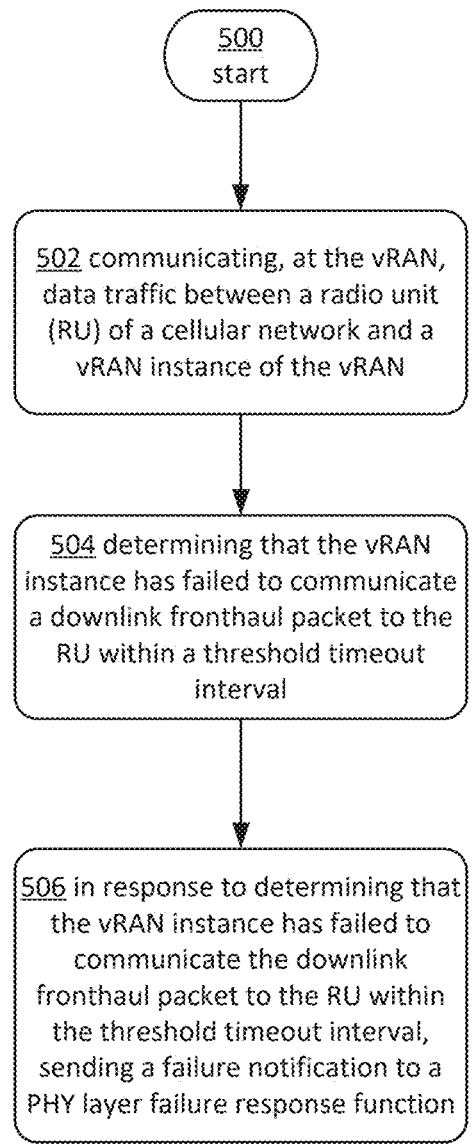
FIG. 5 depicts an operational procedure in accordance with the present disclosure.

FIG. 5 illustrates an example operational procedure for one embodiment of detecting a failure in a virtualized radio access network in accordance with this disclosure. In an embodiment, computing devices and systems may have a memory that has stored thereon computer-executable instructions that, when executed, cause the computing device to perform operations as described.

Referring to FIG. 5, operation 500 begins the operational procedure. Operation 500 may be followed by operation 502. Operation 502 illustrates communicating, at the vRAN, data traffic between a radio unit (RU) of a cellular network and a vRAN instance of the vRAN. In an embodiment, the vRAN instance may be configured to perform PHY layer processing and L2 processing of the data traffic. In an embodiment, the PHY layer is Layer 1 of the Open Systems Interconnection (OSI) model and the L2 is Layer 2 of the OSI model.

Operation 502 may be followed by operation 504. Operation 504 illustrates determining that the vRAN instance has failed to communicate a downlink fronthaul packet to the RU within a threshold timeout interval. In an embodiment, the threshold timeout interval is indicative of a maximum transmission time interval (TTI) between successive downlink fronthaul packets.

Operation 504 may be followed by operation 506. Operation 506 illustrates in response to determining that the vRAN instance has failed to communicate the downlink fronthaul packet to the RU within the threshold timeout interval, sending a failure notification to a PHY layer failure response function. In an embodiment, a healthy vRAN instance communicates a downlink fronthaul packet to the RU within each TTI and a failure to communicate the downlink fronthaul packet to the RU within the threshold timeout interval is indicative of a failure of the vRAN instance.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A method for detecting a failure in a virtualized radio access network (vRAN), comprising:
- communicating, at the vRAN, data traffic between a radio unit (RU) of a cellular network and a vRAN instance of the vRAN, the vRAN instance configured to perform PHY layer processing and L2 processing of the data traffic, wherein the PHY layer is Layer 1 of the Open Systems Interconnection (OSI) model and the L2 is Layer 2 of the OSI model;
- determining that the vRAN instance has failed to communicate a downlink fronthaul packet to the RU within a threshold timeout interval, wherein the threshold timeout interval is indicative of a maximum transmission time interval (TTI) between successive downlink fronthaul packets; and
- in response to determining that the vRAN instance has failed to communicate the downlink fronthaul packet to the RU within the threshold timeout interval, sending a failure notification to a PHY layer failure response function, wherein a healthy vRAN instance communicates a downlink fronthaul packet to the RU within each TTI and a failure to communicate the downlink fronthaul packet to the RU within the threshold timeout interval is indicative of a failure of the vRAN instance.

Clause 2: The method of clause 1, wherein the vRAN instance executes on a first server of the vRAN, the method further comprising:
- in response to receiving the failure notification, initiating, by the PHY layer failure response function, a migration of the PHY layer processing to a second server of the vRAN.

Clause 3: The method of any of clauses 1-2, wherein the initiating comprises sending a command via a functional application platform interface (FAPI), wherein the FAPI is a standard interface between the PHY layer and the L2 layer.

Clause 4: The method of any of clauses 1-3, wherein the PHY layer processing comprises a PHY context including a memory context and computation context, and wherein the migration of the PHY layer processing comprises moving baseband processing of the RU from a PHY context on the first server to a PHY context on the second server.

Clause 5: The method of any of clauses 1-4, wherein the PHY context is instantiated on the second server as a backup PHY context for the RU.

Clause 6: The method of any of clauses 1-5, wherein the communicating, determining, and sending are performed by a programmable switch of the vRAN.

Clause 7: The method of clauses 1-6, wherein the determining is performed in a data plane of the programmable switch.

Clause 8: The method of any of clauses 1-7, wherein the determining and sending are performed within a same PHY processing slot of the vRAN instance.

Clause 9: A programmable switch configured to perform operations comprising:
- communicating data traffic between a radio unit (RU) of a cellular network and a vRAN instance configured to perform PHY layer processing and L2 processing of the data traffic, wherein the PHY layer is Layer 1 of the Open Systems Interconnection (OSI) model and the L2 is Layer 2 of the OSI model;
- determining that the vRAN instance has failed to communicate a downlink fronthaul packet to the RU within a threshold timeout interval, wherein the threshold timeout interval is indicative of a maximum transmission time interval (TTI) between successive downlink fronthaul packets; and
- in response to determining that the vRAN instance has failed to communicate the downlink fronthaul packet to the RU within the threshold timeout interval, sending a failure notification to a PHY layer failure response function, wherein a healthy vRAN instance communicates a downlink fronthaul packet to the RU within each TTI and a failure to communicate the downlink fronthaul packet to the RU within the threshold timeout interval is indicative of a failure of the vRAN instance.

Clause 10: The programmable switch of clause 9, wherein the threshold timeout interval is between 393 microseconds and 500 microseconds.

Clause 11: The programmable switch of any of clauses 9 and 10, wherein the determining is performed using a packet generator of the programmable switch, wherein the packet generator is configured to generate a timer packet at a predetermined fraction of the maximum TTI, wherein the programmable switch is further configured to perform operations comprising:
- increment a value in a timeout register for each generated timer packet, and
- determining that the vRAN instance has failed when the value in the timeout register reaches a predetermined value indicative of the threshold timeout interval.

Clause 12: The programmable switch of any clauses 9-11, wherein sending the failure notification comprises reformatting the timer packet into a failure notification packet.

Clause 13: The programmable switch of any clauses 9-12, wherein the determining is performed in a data plane of the programmable switch.

Clause 14: The programmable switch of any clauses 9-13, wherein the determining and sending are performed within a same PHY processing slot of the vRAN instance.

Clause 15: A virtualized radio access network (vRAN) comprising:
- a programmable switch; and
- a server configured to execute a vRAN instance;
- the programmable switch configured to:
  - communicate data traffic between a radio unit (RU) of a cellular network and the vRAN instance, the vRAN instance configured to perform PHY layer processing and L2 processing of the data traffic, wherein the PHY layer is Layer 1 of the Open Systems Interconnection (OSI) model and the L2 is Layer 2 of the OSI model;
  - determining that the vRAN instance has failed to communicate a downlink fronthaul packet to the RU within a threshold timeout interval, wherein the threshold timeout interval is indicative of a maximum transmission time interval (TTI) between successive downlink fronthaul packets; and
  - in response to determining that the vRAN instance has failed to communicate the downlink fronthaul packet to the RU within the threshold timeout interval, sending a failure notification to a PHY layer failure response function, wherein a healthy vRAN instance communicates a downlink fronthaul packet to the RU within each TTI and a failure to communicate the downlink fronthaul packet to the RU within the threshold timeout interval is indicative of a failure of the vRAN instance.

Clause 16: The vRAN of clause 15, wherein the server is a first server of the vRAN and the programmable switch is configured to:
- in response to receiving the failure notification, initiating, by the PHY layer failure response function, a migration of the PHY layer processing to a second server of the vRAN.

Clause 17: The vRAN of any of clauses 15 and 16, wherein the initiating comprises sending a command via a functional application platform interface (FAPI), wherein the FAPI is a standard interface between the PHY layer and the L2 layer.

Clause 18: The vRAN of any of the clauses 15-17, wherein the PHY layer processing comprises a PHY context including a memory context and computation context, and wherein the migration of the PHY layer processing comprises moving baseband processing of the RU from a PHY context on the first server to a PHY context on the second server.

Clause 19: The vRAN of any of the clauses 15-18, wherein the PHY context is instantiated on the second server as a backup PHY context for the RU.

Clause 20: The vRAN of any of the clauses 15-19, wherein the threshold timeout interval is between 393 microseconds and 500 microseconds.

What is claimed is:

1. A method for detecting a failure in a virtualized radio access network (vRAN), comprising:
    communicating, at the vRAN, data traffic between a radio unit (RU) of a cellular network and a vRAN instance of the vRAN, the vRAN instance configured to perform PHY layer processing and L2 processing of the data traffic, wherein the PHY layer is Layer 1 of the Open Systems Interconnection (OSI) model and the L2 is Layer 2 of the OSI model;
    determining that the vRAN instance has failed to communicate a downlink fronthaul packet to the RU within a threshold timeout interval, wherein the threshold timeout interval is indicative of a maximum transmission time interval (TTI) between successive downlink fronthaul packets; and
    in response to determining that the vRAN instance has failed to communicate the downlink fronthaul packet to the RU within the threshold timeout interval, sending a failure notification to a PHY layer failure response function, wherein a healthy vRAN instance communicates a downlink fronthaul packet to the RU within each TTI and a failure to communicate the downlink fronthaul packet to the RU within the threshold timeout interval is indicative of a failure of the vRAN instance.

2. The method of claim 1, wherein the vRAN instance executes on a first server of the vRAN, the method further comprising:
    in response to receiving the failure notification, initiating, by the PHY layer failure response function, a migration of the PHY layer processing to a second server of the vRAN.

3. The method of claim 2, wherein the initiating comprises sending a command via a functional application platform interface (FAPI), wherein the FAPI is a standard interface between the PHY layer and the L2 layer.

4. The method of claim 2, wherein the PHY layer processing comprises a PHY context including a memory context and computation context, and wherein the migration of the PHY layer processing comprises moving baseband processing of the RU from a PHY context on the first server to a PHY context on the second server.

5. The method of claim 4, wherein the PHY context is instantiated on the second server as a backup PHY context for the RU.

6. The method of claim 1, wherein the communicating, determining, and sending are performed by a programmable switch of the vRAN.

7. The method of claim 6, wherein the determining is performed in a data plane of the programmable switch.

8. The method of claim 1, wherein the determining and sending are performed within a same PHY processing slot of the vRAN instance.

9. A programmable switch configured to perform operations comprising:
    communicating data traffic between a radio unit (RU) of a cellular network and a vRAN instance configured to perform PHY layer processing and L2 processing of the data traffic, wherein the PHY layer is Layer 1 of the Open Systems Interconnection (OSI) model and the L2 is Layer 2 of the OSI model;
    determining that the vRAN instance has failed to communicate a downlink fronthaul packet to the RU within a threshold timeout interval, wherein the threshold timeout interval is indicative of a maximum transmission time interval (TTI) between successive downlink fronthaul packets; and
    in response to determining that the vRAN instance has failed to communicate the downlink fronthaul packet to the RU within the threshold timeout interval, sending a failure notification to a PHY layer failure response function, wherein a healthy vRAN instance communicates a downlink fronthaul packet to the RU within each TTI and a failure to communicate the downlink fronthaul packet to the RU within the threshold timeout interval is indicative of a failure of the vRAN instance.

10. The programmable switch of claim 9, wherein the threshold timeout interval is between 393 microseconds and 500 microseconds.

11. The programmable switch of claim 9, wherein the determining is performed using a packet generator of the programmable switch, wherein the packet generator is configured to generate a timer packet at a predetermined fraction of the maximum TTI, wherein the programmable switch is further configured to perform operations comprising:
    increment a value in a timeout register for each generated timer packet, and
    determining that the vRAN instance has failed when the value in the timeout register reaches a predetermined value indicative of the threshold timeout interval.

12. The programmable switch of claim 11, wherein sending the failure notification comprises reformatting the timer packet into a failure notification packet.

13. The programmable switch of claim 9, wherein the determining is performed in a data plane of the programmable switch.

14. The programmable switch of claim 13, wherein the determining and sending are performed within a same PHY processing slot of the vRAN instance.

15. A virtualized radio access network (vRAN) comprising:
    a programmable switch; and
    a server configured to execute a vRAN instance;
    the programmable switch configured to:
        communicate data traffic between a radio unit (RU) of a cellular network and the vRAN instance, the vRAN instance configured to perform PHY layer processing and L2 processing of the data traffic, wherein the PHY layer is Layer 1 of the Open Systems Interconnection (OSI) model and the L2 is Layer 2 of the OSI model;
        determining that the vRAN instance has failed to communicate a downlink fronthaul packet to the RU within a threshold timeout interval, wherein the threshold timeout interval is indicative of a maximum transmission time interval (TTI) between successive downlink fronthaul packets; and in response to determining that the vRAN instance has failed to communicate the downlink fronthaul packet to the RU within the threshold timeout interval, sending a failure notification to a PHY layer failure response function, wherein a healthy vRAN instance communicates a downlink fronthaul packet to the RU within each TTI and a failure to communicate the downlink fronthaul packet to the RU within the threshold timeout interval is indicative of a failure of the vRAN instance.

16. The vRAN of claim 15, wherein the server is a first server of the vRAN and the programmable switch is configured to:
in response to receiving the failure notification, initiating, by the PHY layer failure response function, a migration of the PHY layer processing to a second server of the vRAN.

17. The vRAN of claim 16, wherein the initiating comprises sending a command via a functional application platform interface (FAPI), wherein the FAPI is a standard interface between the PHY layer and the L2 layer.

18. The vRAN of claim 16, wherein the PHY layer processing comprises a PHY context including a memory context and computation context, and wherein the migration of the PHY layer processing comprises moving baseband processing of the RU from a PHY context on the first server to a PHY context on the second server.

19. The vRAN of claim 18, wherein the PHY context is instantiated on the second server as a backup PHY context for the RU.

20. The vRAN of claim 15, wherein the threshold timeout interval is between 393 microseconds and 500 microseconds.

* * * * *